Jan. 23, 1940.　　　　A. T. THOMPSON　　　　2,187,919
LIQUEFIER
Filed Oct. 26, 1937　　　　2 Sheets-Sheet 1

Inventor
Albert T. Thompson
By Philip A. H. Ferrell
Attorney

Jan. 23, 1940.   A. T. THOMPSON   2,187,919
LIQUEFIER
Filed Oct. 26, 1937   2 Sheets-Sheet 2
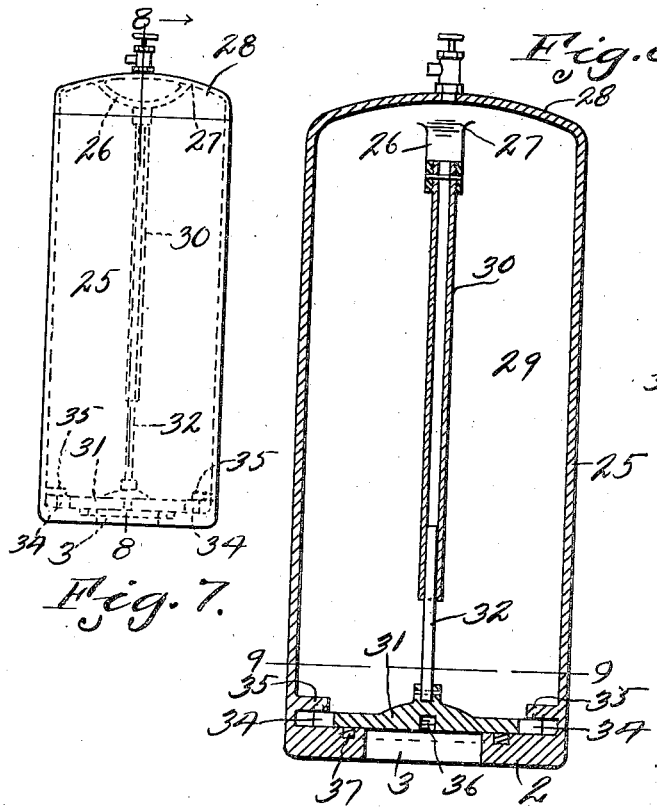
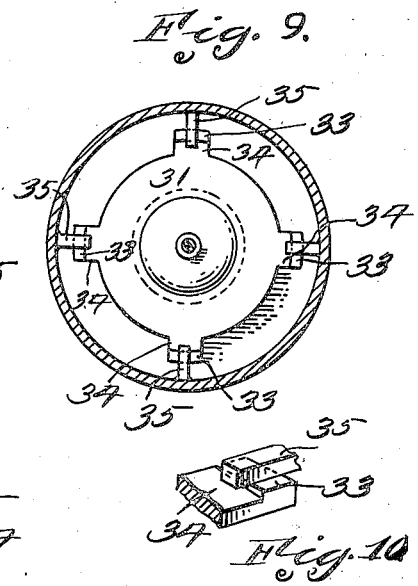
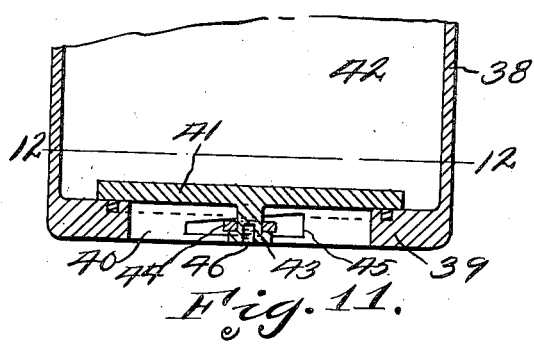
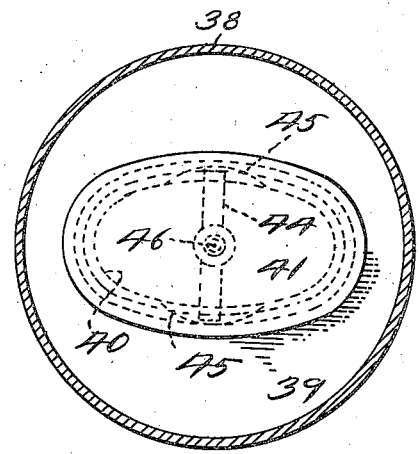
Inventor
Albert T. Thompson
By Philip A. H. Terrell
Attorney

Patented Jan. 23, 1940

2,187,919

UNITED STATES PATENT OFFICE 2,187,919

LIQUEFIER

Albert T. Thompson, New Orleans, La.

Application October 26, 1937, Serial No. 171,153

1 Claim. (Cl. 220—24)

The invention relates to liquefiers and metallic receptacles, and has for its object to provide a device of this kind with a closure cooperating with a filling opening for sealing the filling opening either by spring pressure or by pressure generated within the receptacle after the filling operation.

A further object is to provide expansible spring means cooperating with the closure for maintaining the same in closed position over the filling opening, and which spring means will yield upon pressure being applied to the outer side of closure, thereby allowing the closure to be opened for filling the receptacle through the filling opening.

A further object is to provide the closure with positive guiding means for guiding the same axially inwardly and outwardly for allowing filling of the receptacle, and for closing the receptacle after the filling operation.

A further object is to form the closure and filling opening in a shape other than round, whereby the closure can be removed from its position within the receptacle, and from the receptacle through the filling opening.

A further object is to provide the closure with a pivoted rock bar against the ends of which expansion springs engage for normally forcing the closure to closed position, and allowing the closure to rock and conform to the bottom of the receptacle around the filling opening.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 7 is a view in elevation of a further form of receptacle and closure structure.

Figure 8 is a vertical transverse sectional view taken on line 8—8 of Figure 7.

Figure 9 is a horizontal sectional view taken on line 9—9 of Figure 8.

Figure 10 is a detail perspective view of the cooperating lugs of the cover and receptacle.

Figure 11 is a vertical transverse sectional view of another form of receptacle.

Figure 12 is a horizontal sectional view taken on line 12—12 of Figure 11.

Figure 1:
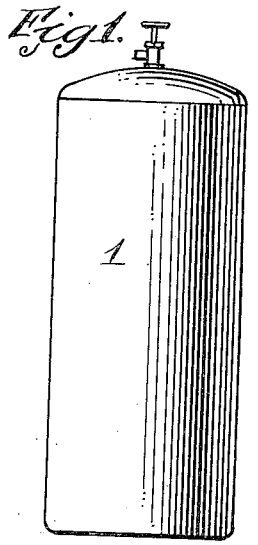
Figure 1 is a view in elevation of the receptacle.
Figure 2:
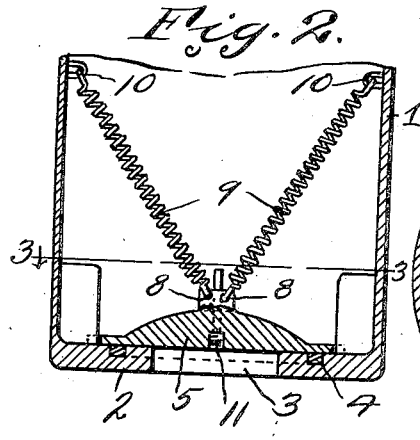
Figure 2 is a vertical transverse sectional view through the lower end of the receptacle.
Figure 3:
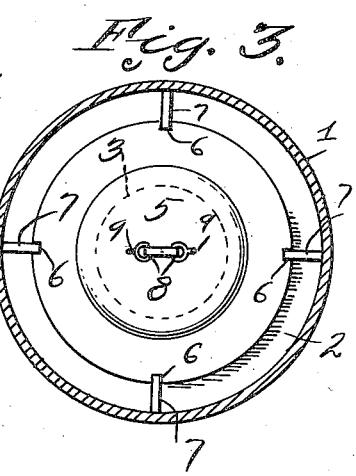
Figure 3 is a horizontal sectional view through the receptacle, taken on line 3—3 of Figure 2.

Referring to the drawings and particularly to Figures 1 to 3, the numeral 1 designates the receptacle, 2 the bottom thereof, and 3 a filling opening. The inner side of the bottom 2, adjacent the filling opening 3, is provided with a gasket 4, against which the spring pressed cover 5 engages. Cover 5 is provided with a plurality of notches 6, which receive the vertically disposed flanges 7 carried by the receptacle 1, and guide the cover in its upward and downward movement. Connected to the inner side of the cover 5 at 8 are upwardly diverging expansion springs 9, the upper ends of which are anchored at 10 to the receptacle in any suitable manner. Expansion springs normally force the cover 5 towards closed position and maintain the receptacle sealed. When it is desired to fill the receptacle, a bolt or tool is inserted in the threaded aperture 11 in the under side of the cover 5, and the cover is forced inwardly until the filling operation is completed. Just as soon as the cover 5 is released, expansion springs 9 force the same to closed sealed position, therefore it will be seen a sealed receptacle is provided which may be used in connection with a pressure or non-pressure container.

Figure 4:
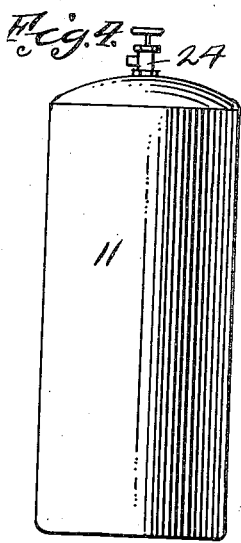
Figure 4 is a view in elevation of another form of receptacle.
Figure 5:
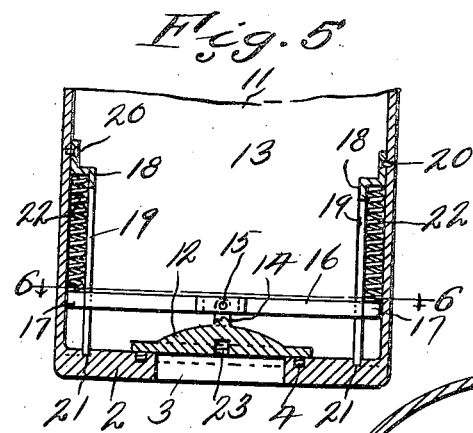
Figure 5 is a vertical transverse sectional view through the lower end of the receptacle shown in Figure 4.
Figure 6:
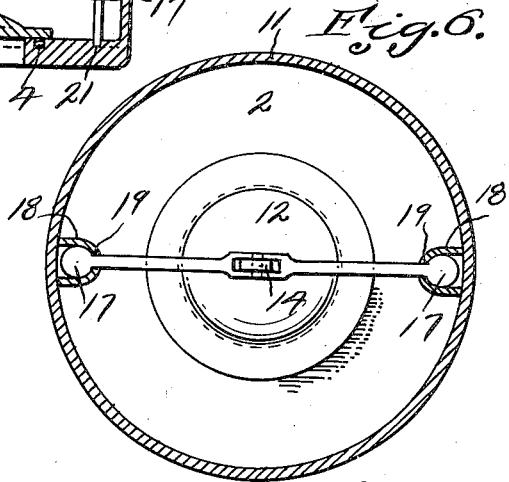
Figure 6 is a horizontal sectional view through the receptacle shown in Figure 5, along line 6—6.

Referring to the form shown in Figures 4 to 6 inclusive, the receptacle 11 has its bottom 2 provided with a filling opening 3, and around which filling opening is a gasket 4. The cover 12 is disposed within the chamber 13 of the receptacle and is provided with an upwardly extending lug 14.

Pivotally mounted at 15 on the lug 14 is a rock bar 16, the outer ends of which are provided with an enlargement 17 within the spring housings 18, the ends of the bar extending through vertical slots 19 in the housings. The housings 18 are secured by means of screws 20 to the inner wall of the receptacle and have their lower ends disposed in U-shaped slots 21 in the bottom 2, as clearly shown in Figure 5, therefore they are rigidly held against displacement. Disposed within the housing 18 and in engagement with the enlargement 17 are expansion springs 22, which normally force the rock bar 16 downwardly, and the closure to closed position. By providing a rock bar, it is obvious the closure will assume a position in the plane of the bottom of the receptacle. Closure 12 is preferably provided with a threaded tool receiving aperture 23 so the operator can force the closure inwardly against the expansive action of the springs 22 for a filling operation, and when the cover is released the springs will again seat the cover and form a sealed closure. It is to be understood the receptacle may be used as a pressure or non-pressure container, and any kind of a discharge valve 24 may be used.

Referring to the form shown in Figures 7 to 10 inclusive, the receptacle 25 is provided with a U-shaped member 26, welded or otherwise secured at 27 to the upper end 28 of the receptacle within the chamber 29, and said U-shaped member is provided with a depending axially disposed tubular member terminating spaced from the bottom 2 of the receptacle and the filling opening 3. The cover 31 is provided with an upwardly extending shaft 32, which is slidably mounted in the tubular member 30, therefore it will be seen the closure can move inwardly from the filling opening for a filling operation, and can easily rotate for placing any of the cam members 33 of the lugs 34 under the lugs 35 of the receptacle.

In operation, a handling tool is placed in the threaded opening 36 of the closure 31, and the closure is then rotated to release the lugs 34, and at which time the closure will be inwardly guided by the telescopic connection formed by the members 30 and 32. When the closure is again moved to a closed position, it is axially guided to a position over the filling opening and in engagement with the gasket 37.

Referring to the form shown in Figures 11 and 12, the receptacle 38 has its bottom 39 provided with an elongated or off-round filling opening 40; it being understood any shape of filling opening may be used, which will allow the closure 41 to be removed from the receptacle chamber 42 through the opening 40. An oval opening is shown for purposes of illustration. Closure 41 is provided with a headed extension 43 on which is pivoted a cross bar 44, the ends of which are received in arcuate cam recesses 45 in opposite sides of the filling opening. The cover is handled in the same manner as in the other forms by the insertion of a tool into the threaded aperture 46.

It is to be understood that the receptacle may be constructed in any manner, according to the use and contents thereof, and may be built up from separate pieces or welded if desired.

The invention having been set forth what is claimed as new and useful is:

The combination with a receptacle having a filling opening, a closure within the receptacle and cooperating with the filling opening, spring housings within the receptacle at opposite sides thereof, of a cross bar carried by the closure and extending into the housings and movable longitudinally therein, and expansion springs within the housings and cooperating with the ends of the bar for forcing the closure to closed position and guiding the closure when moved to open position.

ALBERT T. THOMPSON.